(12) United States Patent  
Bona et al.

(10) Patent No.: US 9,004,365 B2  
(45) Date of Patent: Apr. 14, 2015

(54) ONE-TIME PASSWORD CARD FOR SECURE TRANSACTIONS

(75) Inventors: John K. Bona, York, PA (US); Mark A. Cox, West Chester, PA (US)

(73) Assignee: X-Card Holdings, LLC, West Chester, PA (US)

( * ) Notice: Subject to any disclaimer, the term of this patent is extended or adjusted under 35 U.S.C. 154(b) by 119 days.

(21) Appl. No.: 13/885,607

(22) PCT Filed: Jul. 8, 2011

(86) PCT No.: PCT/US2011/043340  
§ 371 (c)(1),  
(2), (4) Date: May 15, 2013

(87) PCT Pub. No.: WO2012/071078  
PCT Pub. Date: May 31, 2012

(65) Prior Publication Data  
US 2013/0228628 A1 Sep. 5, 2013

Related U.S. Application Data

(60) Provisional application No. 61/416,587, filed on Nov. 23, 2010.

(51) Int. Cl.
| | |
|---|---|
| G06K 19/06 | (2006.01) |
| G06Q 20/40 | (2012.01) |
| G06F 21/34 | (2013.01) |
| H04L 9/32 | (2006.01) |

(52) U.S. Cl.  
CPC ............. *G06Q 20/409* (2013.01); *G06K 19/06* (2013.01); *G06F 21/34* (2013.01); *H04L 9/3228* (2013.01)

(58) Field of Classification Search  
USPC .......................................... 235/487, 491, 492  
See application file for complete search history.

(56) References Cited

U.S. PATENT DOCUMENTS

| | | | |
|---|---|---|---|
| 2006/0227523 | A1 | 10/2006 | Pennaz et al. |
| 2007/0277044 | A1 | 11/2007 | Graf et al. |
| 2008/0296367 | A1 | 12/2008 | Parkinson |
| 2009/0199004 | A1 | 8/2009 | Krawczewicz et al. |
| 2009/0200371 | A1* | 8/2009 | Kean et al. ............... 235/379 |
| 2009/0277968 | A1 | 11/2009 | Walker |
| 2010/0140358 | A1 | 6/2010 | Couck |

OTHER PUBLICATIONS

International Search Report and Written Opinion dated Nov. 30, 2011 in corresponding International Application No. PCT/US11/43340.

* cited by examiner

*Primary Examiner* — Daniel Hess  
(74) *Attorney, Agent, or Firm* — Duane Morris LLP; Joseph A. Powers

(57) ABSTRACT

A card for use in secure transactions includes a card body having a first major surface and a second major surface; one or more groupings of a plurality of individual distinct symbols viewable from the first major surface, each individual distinct symbol comprising a single segment defining the individual distinct symbol that upon activation illuminates the respective individual distinct symbol; and a controller coupled to the plurality of individual distinct symbols. The controller is operable to produce a one-time password value and to selectively activate individual ones of individual distinct symbols to identify a sub-combination of the plurality of individual distinct symbols, thereby displaying an illuminated one-time password token for use in a secure transaction.

20 Claims, 14 Drawing Sheets

8 Digit OTP Value = 47109258

ONE-TIME PASSWORD CARD FOR SECURE TRANSACTIONS

CROSS REFERENCE TO RELATED APPLICATIONS

This application claims priority to U.S. Provisional Application No. 61/416,587 entitled "OTP Utilizing Electrochromic Inks" filed Nov. 23, 2010, the entirety of which is hereby incorporated by reference herein.

FIELD OF THE INVENTION

The present invention relates to transaction cards, and more specifically to transaction cards for providing onetime passwords for use in secure transactions.

BACKGROUND OF THE INVENTION

One-time passwords (OTP) have been in use for access control applications for a number of years and provide a level of security by allowing dynamic data to be used in accessing physical and logical assets and by providing for multi-factor authentication. As the name implies, an OTP is a password that is valid for only one login session or transaction. OTPs avoid a number of shortcomings that are associated with traditional (static) passwords. For example, in contrast to static passwords, they are not vulnerable to replay attacks. This means that an OTP that was already used to log into a service or to conduct a transaction is of no value to a potential intruder since it will be no longer valid.

SUMMARY OF THE INVENTION

A card for use in secure transactions includes a card body having a first major surface and a second major surface; one or more groupings of a plurality of individual distinct symbols viewable from the first major surface, each individual distinct symbol comprising a single segment defining the individual distinct symbol that upon activation illuminates the respective individual distinct symbol; and a controller coupled to the plurality of individual distinct symbols. The controller is operable to produce a one-time password value and to selectively activate individual ones of the individual distinct symbols to identify a sub-combination of the plurality of individual distinct symbols, thereby displaying an illuminated one-time password token for use in a secure transaction.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
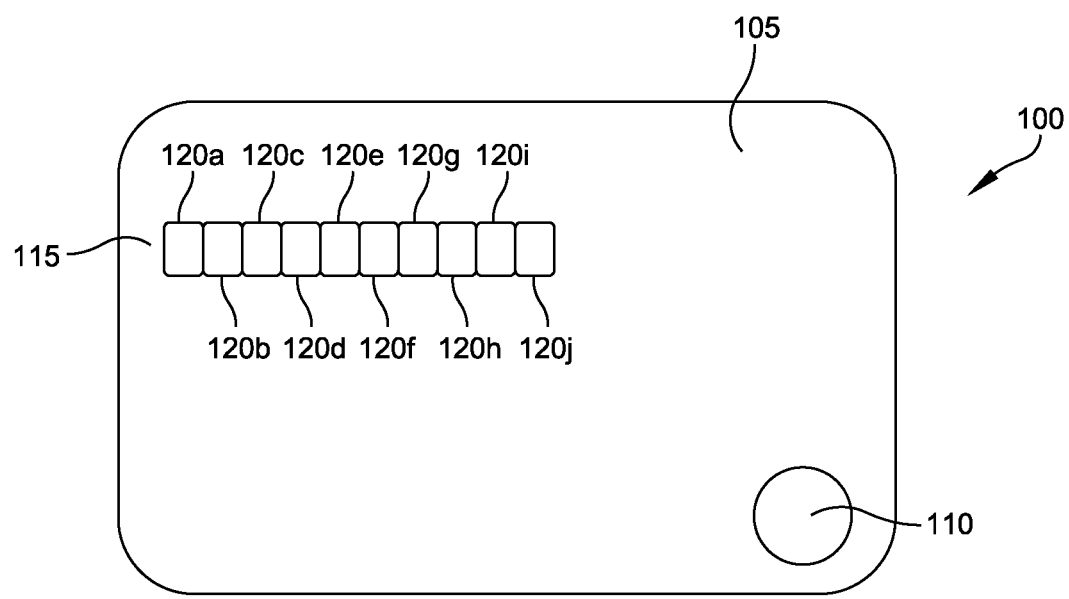
FIG. 1 illustrates an embodiment of an OTP card having a single grouping of individual distinct electrochromic elements for displaying an OTP value.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1 illustrates a frontal view of a card 100 for use in secure transactions. The card has a front face or surface 105 and a rear surface (not shown) on the opposite side thereof. The card has a button or other means 110 for activating the card 100. The card also has one or more groupings 115 of a plurality of individual distinct symbols viewable from the front surface 105. Each symbol is associated with a respective electrochromic element 120 that upon activation illuminates the respective individual distinct symbol of that electrochromic element. The grouping 115 is shown as including ten electrochromic elements 120a to 120j corresponding to symbols "0" to "9" respectively. Though this particular embodiment uses numeric symbols, letters, other symbols or combinations thereof (sometimes referred to herein as "symbol", "icon" or "symbolic icon") may be used.

As described in more detail below, the card 100 includes a controller coupled to the plurality of individual distinct symbols that is operable to selectively activate individual ones of the individual distinct symbols to identify a sub-combination of the plurality of individual distinct symbols in accordance with a pre-programmed OTP algorithm, thereby displaying an illuminated one-time password token at the front surface 105 of the card 100 for use in a secure transaction.

Each of the electrochromic elements 120a to 120j has an electrochromic ink printed in the shape of the symbol with which it is associated. Depending on the charge on their respective electrodes, each symbol is either visible or invisible, or at least conspicuous or inconspicuous with respect to its surroundings, as necessary to convey an OTP value. Using electrochromic inks to print a series of symbolic icons (e.g., numbers) the initial state of the icons will be invisible, inconspicuous or a first color. Upon activation of the card 100 the controller uses an OTP token algorithm to compute the next expected value and then proceeds through a process to display the numeric values sequentially by enabling an icon to be visible or change its appearance (e.g., become more conspicuous or change color) by applying an electric charge. The controller then removes the electric charge to change the state of the icon back to its original (non-active) display state (e.g., invisible, less visible or a different color) and proceeds to the next numeric value to display until all significant digits of the OTP value have been displayed.

The card can come in any form factor/dimension. In embodiments, the card 100 has about the same dimensions as a credit card (85.60 mm×53.98 mm×0.76 mm).

It should be understood that any length of OTP value and any algorithm for generating an OTP value may be utilized by the card 100. OTP token values today commonly contain between 6 and 8 numeric digits. Two common solutions prevail today: (i) event based algorithms, and (ii) time based algorithms. Event based algorithms use a sequential counter and an encryption key to derive the next OTP value. Time based algorithms use a time value and encryption key to derive the next OTP value. OTP tokens generate the value but the value needs to be authenticated prior to providing access to the secured resource (e.g., account, sensitive information, facility, etc.). Event based solutions attempt to keep the sequential counter in sync between the OTP token and the authentication server. Time based solutions attempt to keep the time based value in sync between the OTP token and authentication server. OTP algorithms and authentication systems therefor are well known to those in the art of secure transactions and are not repeated herein so as to avoid obscuring the present description.

Although at times the symbol states are discussed herein as being invisible (e.g., a first or non-enabled state) and visible (e.g., a second or enabled state), it should be understood that the first state could be a first color and the second state a second color, or the first state could be inconspicuous (e.g., lightly displayed) and the second state could be conspicuous (e.g., boldly displayed). Unless specifically described otherwise, the concepts described herein are intended to encompass any method of setting apart a symbol from its surroundings for purposes of using that symbol as a digit or portion of an OTP value. For example, the electrochromic element could be printed as a circle around or line under an always-visible number, where illumination of the circle or line conveys the symbol as being part of the OTP value.

Figure 2:
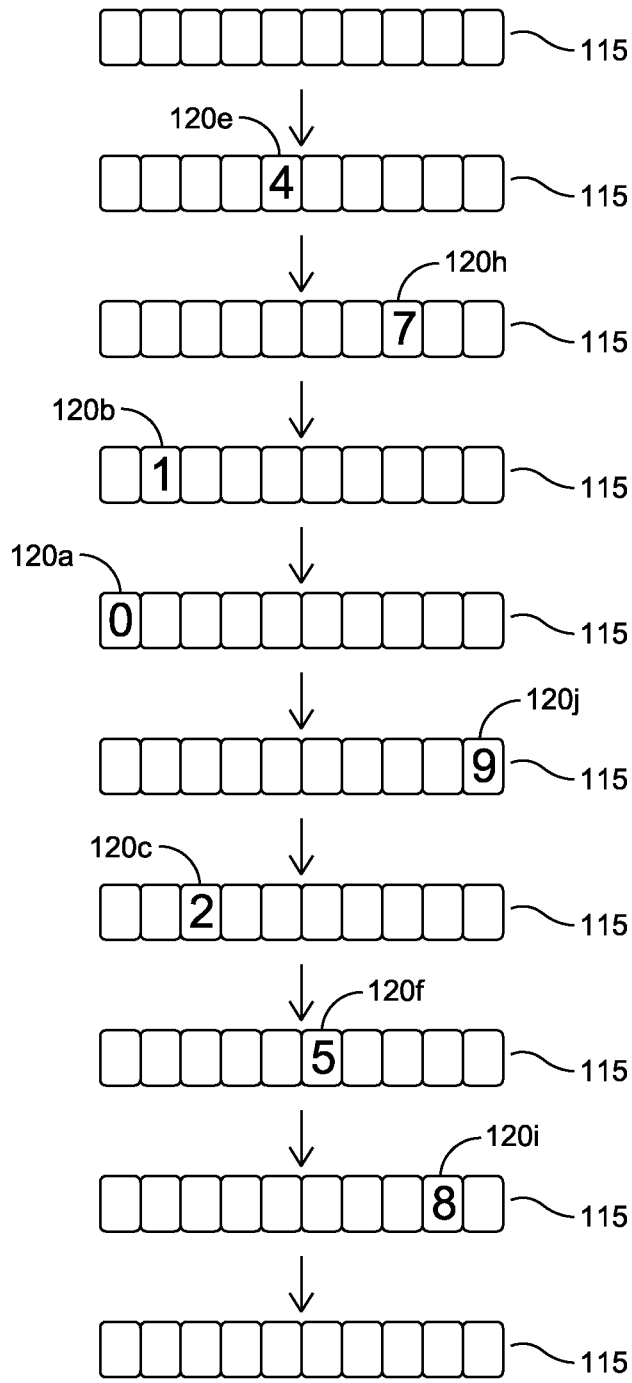
FIG. 2 illustrates the operation of the card of FIG. 1 in displaying an 8 digit OTP value.

With reference to both FIGS. 1 and 2, when a user presses the activation button 102, the card 100 powers up, computes the next OTP value and displays this value using the electrochromic elements 120 of grouping 115. By way of example and now with specific reference to FIG. 2, assume that this OTP value is the eight digit value "47109258". FIG. 2 shows the temporal progression of the display on the front face 105 of the card 100. From top to bottom, the symbols in the grouping 115 are initially invisible, indicating the card 100 is inactive or only just turned on. After the OTP value 47109258 is calculated, the first digit of the OTP values is used to determine which electrochromic element is to be activated. In this case, the first digit is "4" and the fifth electrochromic element 120e, corresponding to the symbol "4", is activated to display the first digit "4" from the OTP value. During this display period, a voltage is applied to the circuit that controls the element 120e and the symbol changes to its visible state. The voltage is applied for a period sufficient to allow the user to record the number before the voltage is removed, which allows the displayed symbol to fade and then disappear. The next digit from the OTP value is then processed in the same manner. As shown in FIG. 2, the second digit from the OTP value is used to determine which electrochromic element 120 to activate, here the seventh electrochromic element 120h for displaying the symbol "7". Again, the element 120h is displayed for a sufficient period to allow the user to record the number before fading or disappearing. This process is repeated until each value from the OTP value is sequentially displayed to the user. Finally, when the complete value has been displayed, the card is turned off and all symbols return to their normal invisible state. In this manner, an OTP value of any length can be displayed.

Each digit of the OTP value is displayed via its related electrochromic element long enough for the card holder to recognize, memorize, transcribe and/or type the symbol, e.g., 0.5-1 second each. Electrochromic materials have properties that determine how long the symbols will take, when a voltage is applied, to change to the visible state and how long it takes, once the voltage is removed, to revert back to the invisible state. In this illustrated embodiment, the time period where voltage is being applied should not start until the visibility of the previous symbol dissipates to a significant degree. It should be apparent that it is not necessary for the symbol to completely disappear before a next symbol is enabled, so long as it is apparent to the user which symbol is currently asserted, i.e., that one symbol is more conspicuous than the others.

Figure 2A:
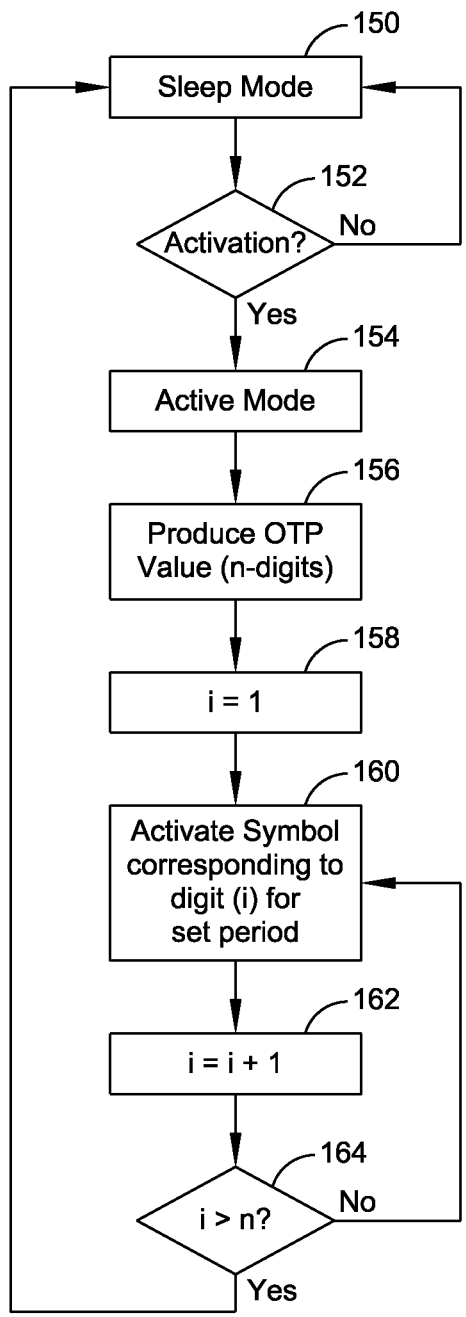
FIG. 2A is a flow chart illustrating the operation of the controller of the card of FIG. 1.

As described below in more detail, the card 100 includes a controller for controlling the operation of the card 100 in displaying the OTP value. FIG. 2A is a flow diagram illustrating the operation of the controller. At step 150, the controller is in the inactive, power down or sleep mode. At step 152, the controller determines if it has been triggered out of the sleep mode and into the active mode, such as by a press of on button 110. If the button 110 was selected, the controller enters the active mode (step 154). The controller then produces an OTP value having n-digits in accordance with a pre-programmed OTP algorithm (step 156). A counter element is set at step 158 (i.e., i=1). At step 160, the controller activates the symbol corresponding to digit(i) for a set period of time. At step 162, the counter is incremented (i.e., i=i+1). At step 164, it is determined if the counter is greater than n. If the counter is not greater than n, then the flow returns to step 160. If at step 164 the counter is greater than n, then the controller returns to sleep mode (step 150).

Figure 3:
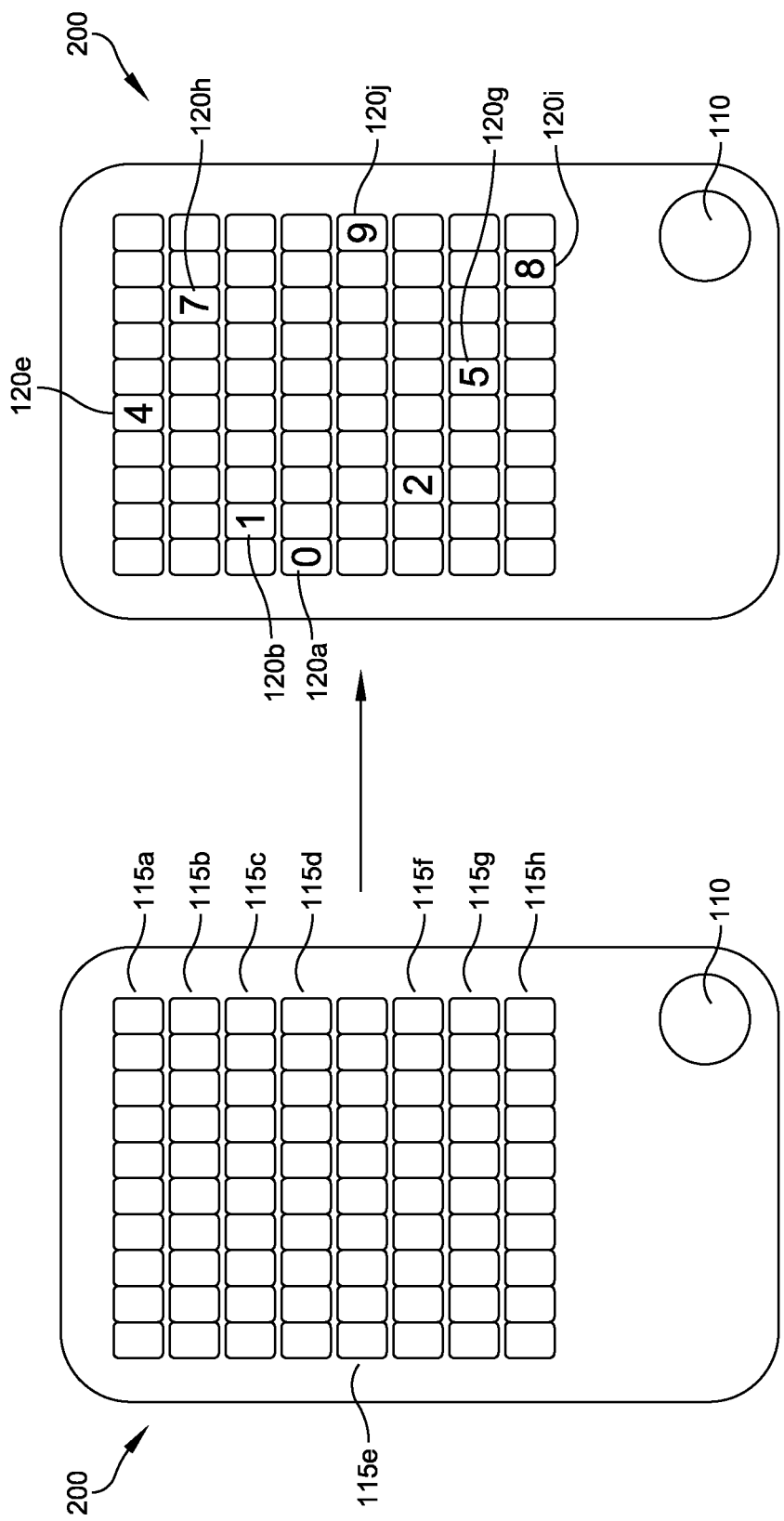
FIG. 3 illustrates an alternative embodiment of an OTP card having plural groupings of individual distinct electrochromic elements forming a multi-row, multi-column matrix for displaying an OTP value, and the operation of the card in displaying an 8 digit OTP value.

FIG. 3 shows a different embodiment of an OTP token card 200. The card 200 is identical to the card 100 of FIG. 1 except that it includes multiple groupings 115 of individual distinct electrochromic elements 120. Like card 100, the card 200 is activated via button 110, at which time a multi-row matrix of symbols is used to display the next OTP value. As with the embodiment of FIG. 1, the device 200 starts with all of the electrochromic elements 120 in their invisible state. Each grouping 115 of electrochromic elements 120 corresponds to a significant digit in the OTP value, i.e. the first grouping 115a corresponds to the first digit of the OTP value, the second grouping 115*b* corresponds to the second digit of the OTP value, etc. Each of the digits from the OTP value would be used to change the state of one electrochromic element 120 from its associated grouping 115 of electrochromic elements 120. The OTP value would then be read by the user from top to bottom. FIG. 3 illustrates the display of an OTP value using card 200. After activation of the card 200 via button 110, an eight digit OTP value (47109258) is calculated an used to selectively activate corresponding electrochromic elements 120*e*, 120*h*, 120*b*, 120*a*, 120*j*, 120*c*, 120*f* and 120*i* from groupings 115*a* to 115*h*, respectively. All eight digits are displayed simultaneously for a period of time (e.g., 5-10 seconds then the voltage to those electrochromic elements 120 would be removed and all eight digits would return to their invisible state.

It should be understood that the matrix could be arranged to display and read the OTP value from left to right, as opposed to top to bottom, or other arrangement as desired.

Figure 4:
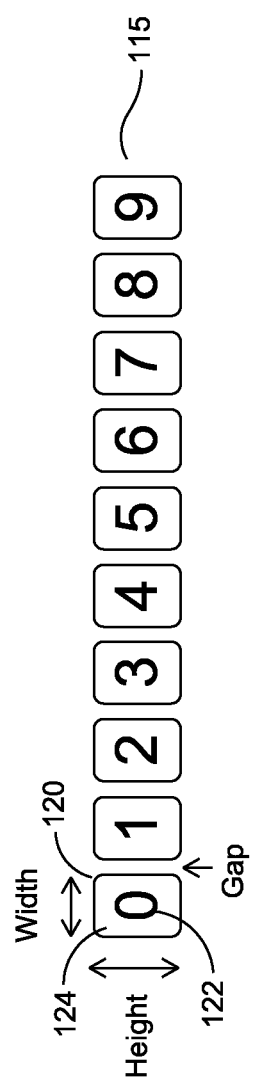
FIG. 4 illustrates details of a grouping of electrochromic element.

FIG. 4 illustrates in some more detail the electrochromic elements 120. Each electrochromic element 120 is provided in a printed area 124 having a height and width, with the printed areas 124 separated by a predefined gap. Each electrochromic element 120 is created by printing multiple layers of ink containing different compounds that will result in a symbol being visible when the proper bias is applied. Of course, as noted above, the symbol itself need not be formed as the electrochromic indicator. Rather, the electrochromic indicator can also be placed in proximity to a non-electrochromic pre-printed, embossed, otherwise formed symbol in order to show a selection of that symbol. For example, the electrochromic indicator could be a backlit light for the symbol indicating its selection (i.e., inclusion in an OTP value) or a line or other pointer placed in proximity to and associated with each respective symbol (e.g., a plurality of electrochromic lines placed under pre-printed numbers, one line per number, that when lit identifies the number as being part of an OTP value). One advantage of using electrochromic elements is that the actual symbol 122 of each element 120 can be printed as a single segment. This greatly simplifies the connection circuitry to an individual symbol element. That is, for example, some display technologies will have 7 segment for each symbol, such that each segment can be selectively activated to show the numbers "0" to "9", e.g., all seven segments are activated to display an "8" and only two segments are activated to display the number "1".

Electrochromic elements are formed using ink systems containing inks that are printed in a stack to form an electrochromic element. Ink systems of this type are available from NTERA, Inc. of Radnor, Pa. and are referred to by NTERA as its NANOCHROMICS™ Ink Systems. Example ink systems include NTERA's IS-3.1 six layer ink system, IS-3.2 five layer ink system and IS-4.0 screen printable ink system for alpha-numeric displays. Structures for electrochromic elements are also described in, for example, U.S. Pat. No. 7,460,289 to Pichot et al., the entirety of which is hereby incorporated by reference herein, and in Colin Pratt, "Chromism", available at the date of this filing at http://homepage.ntlworld.com/colin.pratt/Chromism.pdf. Pratt discloses a layered construction for an electrochromic element comprising, from top to bottom: protective coating/indium tin oxide/primary electrochromic layer/ionically conductive electrolyte/secondary electrochromic layer/reflective counter electrode/base substrate layer. Generally, each electrochromic system is similar in that it utilizes a layered construction and one or more electrochromic layers. There are a number of electrochromic materials available for use, and the embodiments disclosed herein are not limited to any particular electrochromic element structure. Rather, these citations are provided by way of example only.

Figure 5A:
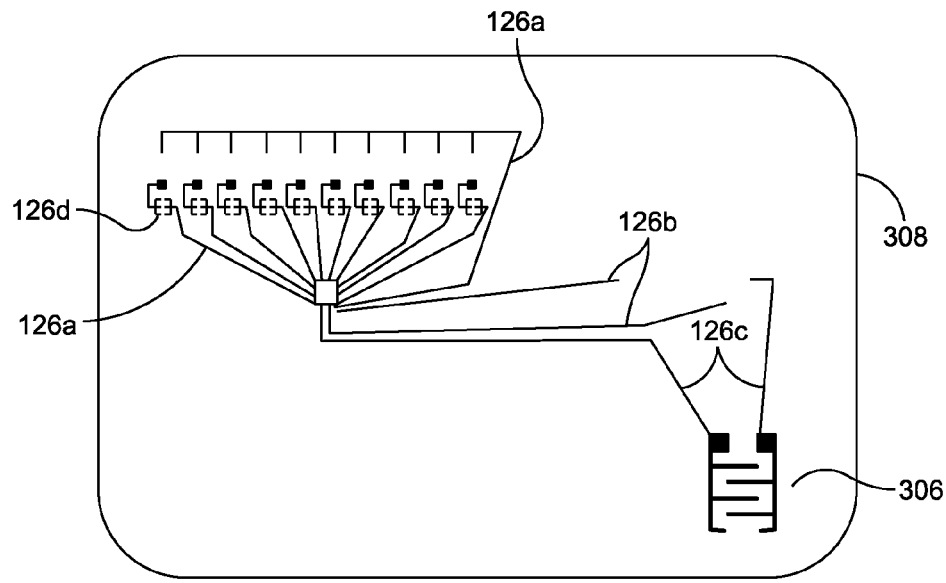
FIGS. 5A-5D illustrate a method of manufacturing an electronic inlay layer for an OTP card and the structure thereof.

In embodiments, the device is formed using an electronics inlay that is sandwiched between one or more top and bottom overlay layers. FIG. 5D shows a general design for an exemplary embodiment of an electronics inlay 300 for use in forming card 100. FIGS. 5A to 5D illustrate a method of making the electronics inlay 300.

With reference initially to FIG. 5D, the electronics inlay 300 contains the grouping 115 of electrochromic elements 120 and a secure microcontroller 302 that can generate OTP values and control the electrochromic elements 120 to display the present OTP value. Examples of secure microcontrollers that may be used in certain embodiments include the AT91SC512384-128M 32-bit secure microcontroller from Atmel Corp. of San Jose, Calif. and the secure microcontroller family of products from Microchip Technology, Inc. of Chandler, Ariz., such as the PIC18(L)F2X/4XK22 low-power, high-performance secure microcontroller. Circuitry 126 is provided for connecting the various components, including circuitry 126*a* connecting the secure microcontroller 302 to the electrochromic elements 120, circuitry 126*b* connecting the secure microcontroller 302 to a battery 304 and circuitry 126*c* connecting the activation switch 306 to secure microcontroller 302 and battery 304. The secure microcontroller 302 selectively provides voltages through circuitry to the electrochromic elements 120 for activating these elements. Discrete components, for example resistors, may also be provided within circuitry 126*a* as needed. Specifically, a resistor (not shown) would be placed at each contact area 126*d* to complete the circuit path.

The connection circuitry 126 for connecting the major electronic components can be formed by, for example, a reductive method, e.g., copper etching or an additive method, e.g., printed conductive silver ink, which are two of the well known number of processes available for providing the electrical connections for the electronics inlay 300. It should be appreciated that only one possible circuitry layout is illustrated in FIGS. 5A-5D and that other layouts may be used for connecting various illustrated components that will be readily apparent to those of ordinary skill in this art.

Solicore, Inc. of Lakeland Fla. provides batteries (e.g., Solicore FLEXION™ line of lithium polymer batteries and) that can support the power requirements of the device 100 at physical dimensions suiting a plastic card of about 0.76 mm thickness and which can withstand subsequent hot lamination processes.

The controller 302 is always in a powered state but may be in a very low power mode (e.g., sleep mode) until the user presses the activation button 110, triggering switch 306 underlying it. At that point, controller 302 resumes full power mode and executes its operating instructions for calculating the next expected OTP value. Switch 306 can be a capacitive switch, resistive switch or any other switch or trigger means for indicating to the controller 302 that the button 110 has been selected. The switch is connected between microcontroller 302 and a terminal of the battery. There is an internal pull up resistor inside the microcontroller 302. The microcontroller 302 detects a contact closure, awakes executes its programming to generate and display an OTP value and then returns to sleep mode.

As noted above, FIGS. 5A to 5D illustrate one exemplary method of manufacturing the electronics inlay 300. Turning to FIG. 5A, in one embodiment, the process begins with a copper coated FR-4 compliant printed circuit board 308. The copper coating is etched and treated, and the unnecessary copper is removed leaving the circuitry 126 and activation switch 306. This process is well known in the art of PCB manufacturing.

Figure 5B:
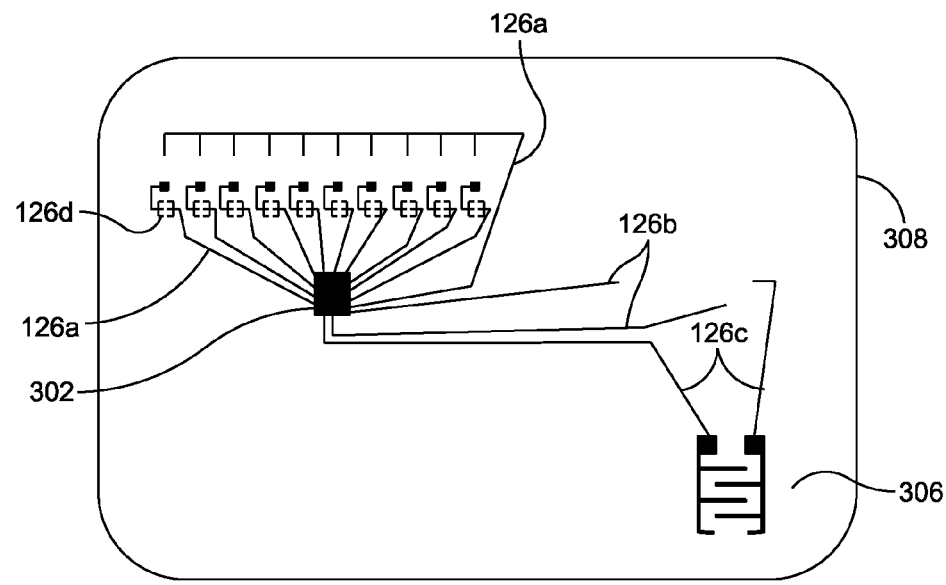
Figure 5C:
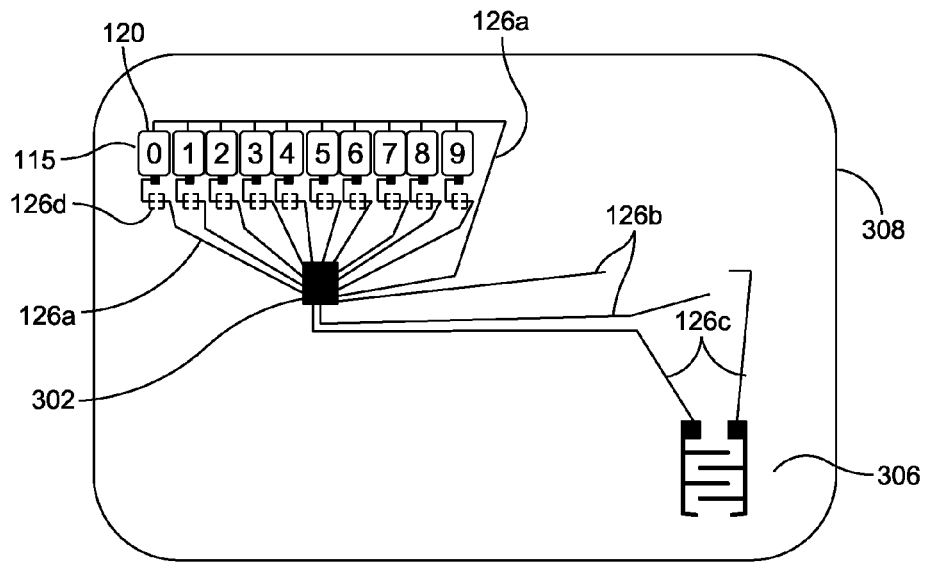
Figure 5D:
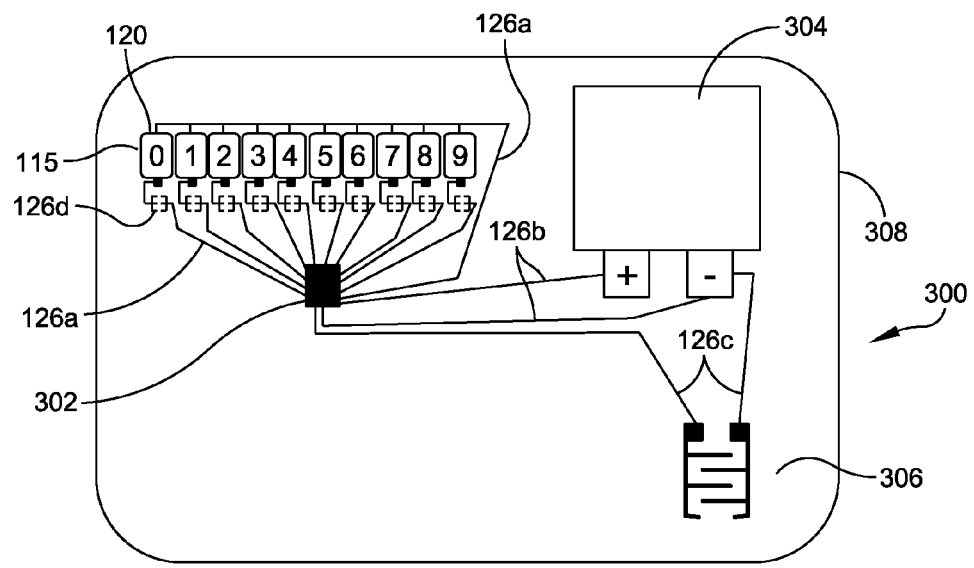

With reference to FIG. 5B, after forming circuitry 126, any discrete components, such as the secure microcontroller 302, are placed in the designated areas to make the requisite electrical connections to circuitry 126, forming what is commonly referred to as a PCB Assembly or PCBa. The microcontroller can be connected to the PCBa by, for example, an adhesive. Other discrete components could also be included within the device to provide desired functionality. In an alternative embodiment, the secure microcontroller 302 can be secured to the PCBa after the electrochromic elements 120 are formed (FIG. 5C), As shown in FIG. 5C, the PCBa is used in a printing process to print each of the necessary layers (described above) to produce functional electrochromic elements 120 of the grouping 115. While the symbols 0 to 9 are shown as being visible, this is for illustrative purposes only and it should be understood that these symbols are invisible until individually activated. Silk screen or flexographic (roll-to-roll) printing processes are examples of processes that may be employed to print the necessary layers. Each stage involves the steps of printing the ink for a layer and then subjecting the ink to the required amount of drying prior to printing the successive layer. When all layers have been printed, dried and treated according to the manufacturer's specifications, an electrochromic element 120 is produced.

As shown in FIG. 5D, after printing the electrochromic elements 120, other components can be assembled on the PCBa. For example, the battery 304 can be positioned on the PCBa and soldered onto the PCBa or otherwise connected using a conductive adhesive. There are also other options for placing a battery on the PCBa. For example, Thin Profile Technologies of Champlin, Minn. provides a battery technology that can be printed directly on a PCB material. The battery chemistry is carbon zinc, with a manganese dioxide cathode and a zinc anode. These batteries can have a capacity of up to 2.5 mAh/cm$^2$ and be provided in thicknesses ranging from 0.1 mm to 1.0 mm. Printing of the battery and terminals on the PCBa can occur prior to or after the step of printing the electrochromic elements 120.

Figure 6:
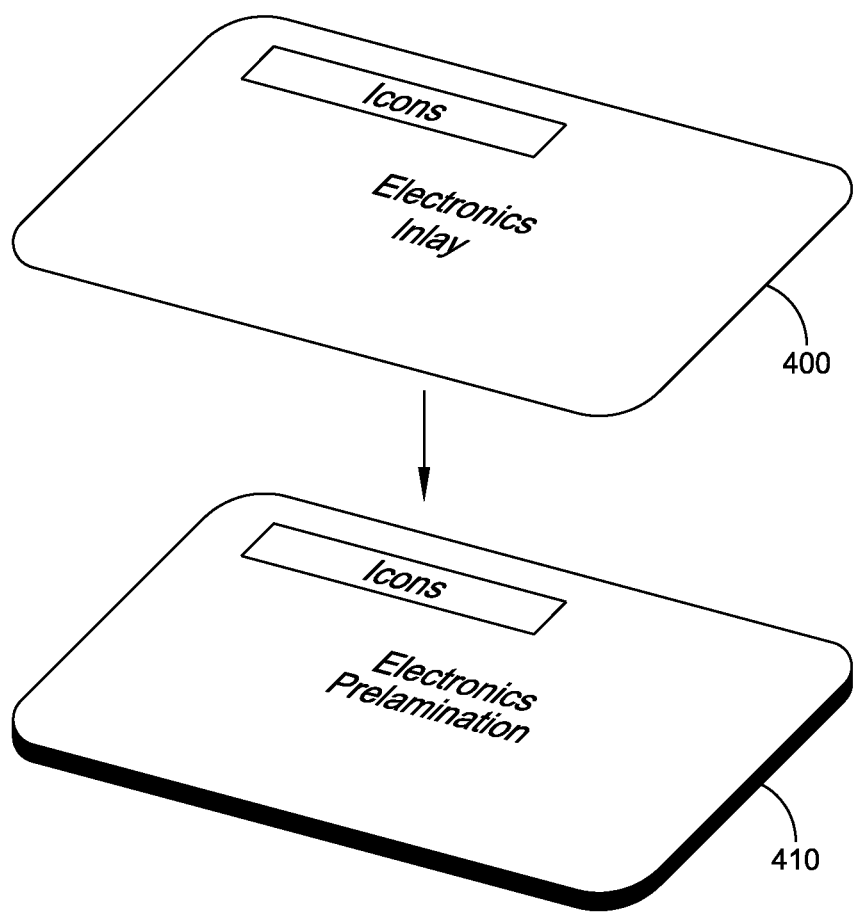
FIG. 6 illustrates an electronic prelamination layer and manufacture thereof for use in forming an OTP card in a hot lamination process.

FIGS. 6-9 illustrate various methods of forming the card 100 from an electronics inlay. With reference to FIG. 6, in one embodiment an electronics inlay 400, such as the one described above in connection with FIG. 5D, is subjected to an encapsulation process to produce a prelamination layer 410. In embodiments, the encapsulation layer can be a protective clear PVC/PET coating that helps support the internal electronics of the prelamination layer 410 during a subsequent hot lamination operation. The encapsulated inlay 410 also provides a consistent cover and avoids most deformation issues that may otherwise occur during the hot lamination finishing process.

Figure 7:
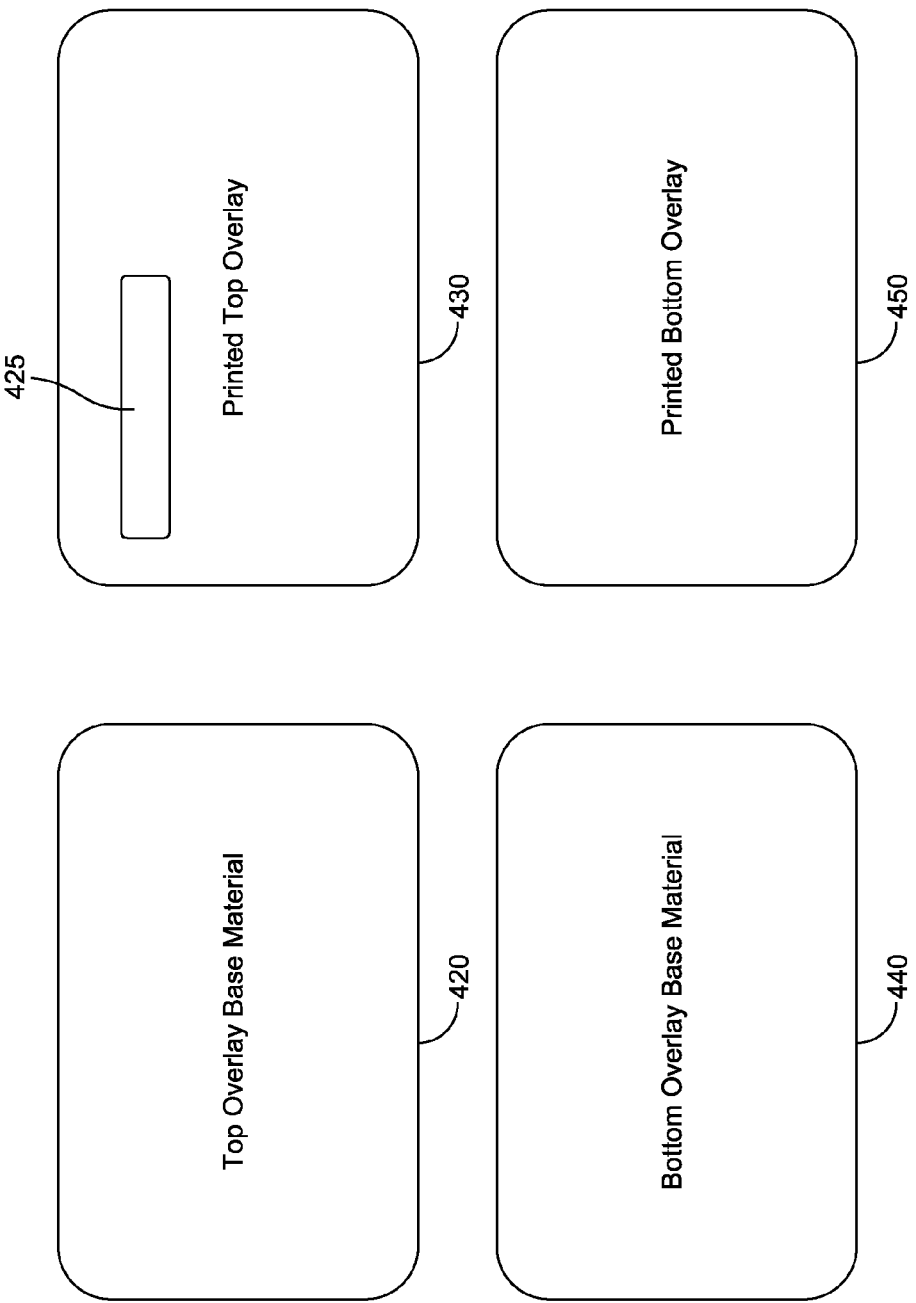
FIG. 7 illustrates top and bottom printed overlay layers for use in forming an OTP card and manufacture thereof.

FIG. 7 shows the basic process for forming the top and bottom overlay layers for use in manufacturing the card 100. Base materials 420, 440 are provided. In embodiments, the base materials are a Melinex® biaxially oriented polyester film from the DuPont Teijin Films family. In embodiments, the film may be 3-5 mils thick. A clear film is preferred for the top overlay base material 420 because a clear window 425 is needed to view the electrochromic symbols from the electronics inlay layer 400. A white film may be used for the bottom overlay base material 440 since there is no such requirement for a clear window.

Any desired design graphics and information are then printed on the base materials 420, 440, and the materials are subsequently laminated with a 1 mil thick clear laminate material to provide printed top and bottom overlay 430, 450. The laminate material provides protection for any printed graphics or information. Alternatively, a varnish layer may be provided for protection. Another alternative is subsurface printing on a clear base material.

Figure 8:
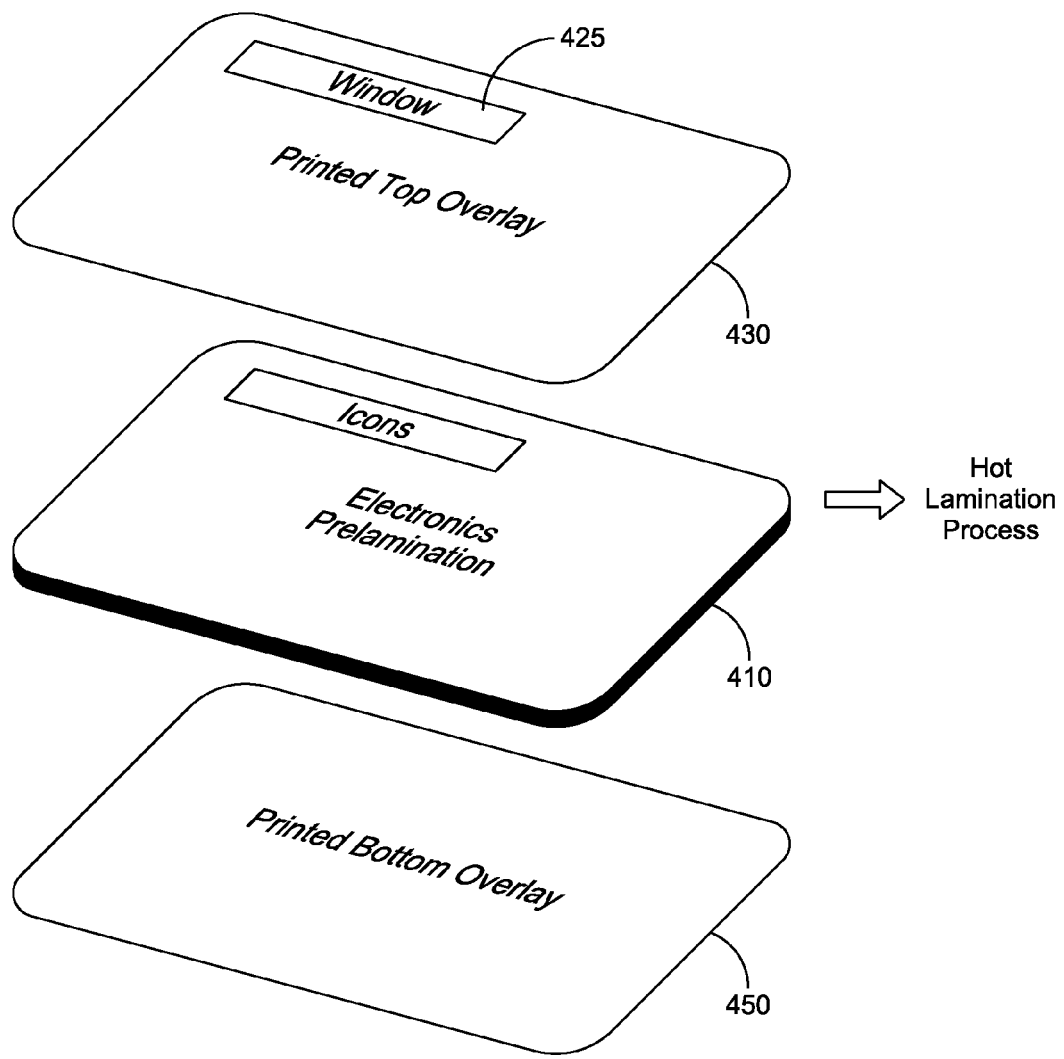
FIG. 8 illustrates various layers for use in a hot lamination process for forming an OTP card.

FIG. 8 illustrates the printed top overlay layer 430, electronics prelamination layer 410 and printed bottom overlay layer 450 are then subject to a hot lamination finishing operation. This operation fuses the three layers by applying the necessary heat and pressure over a specific time to form a finished card 100. Details of such hot lamination processes are known to those familiar with the art of manufacturing plastic cards and are not repeated herein.

Figure 9:
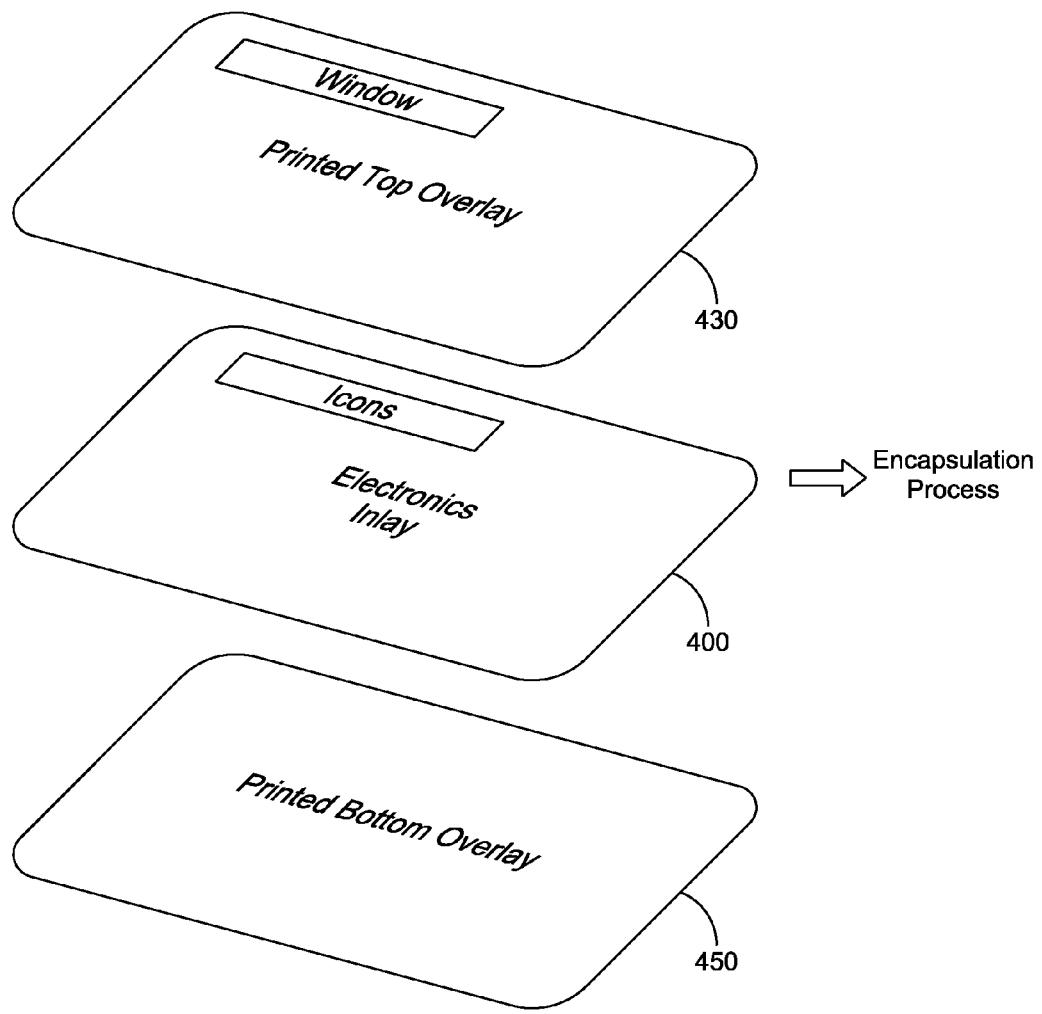
FIG. 9 illustrates various layers for use in an encapsulation process for forming an OTP card.

FIG. 9 illustrates an alternate method of produce the finished card 100. As with the method of FIG. 8, the printed top and bottom overlay layers 430, 450 are provided. A cold lamination process is then used to encapsulate the electronics inlay 400 between the printed top and bottom overlays 430, 450. Nagra ID of the Kudelski Group, headquartered in La Chaux-de-Fonds, Switzerland, provides one example of a cold lamination production process for embedding sophisticated electronic components into a wide variety of form factors, including ISO 7810 conforming plastic cards.

Alternatively, the REACTION INJECTION EMBEDDING® encapsulation process for active electronic components from Innovatier Inc. of Lakeland Fla. may be used, which involves injecting a molding material over the layers to adheres all three layers into a finished card 100.

Figure 12A:
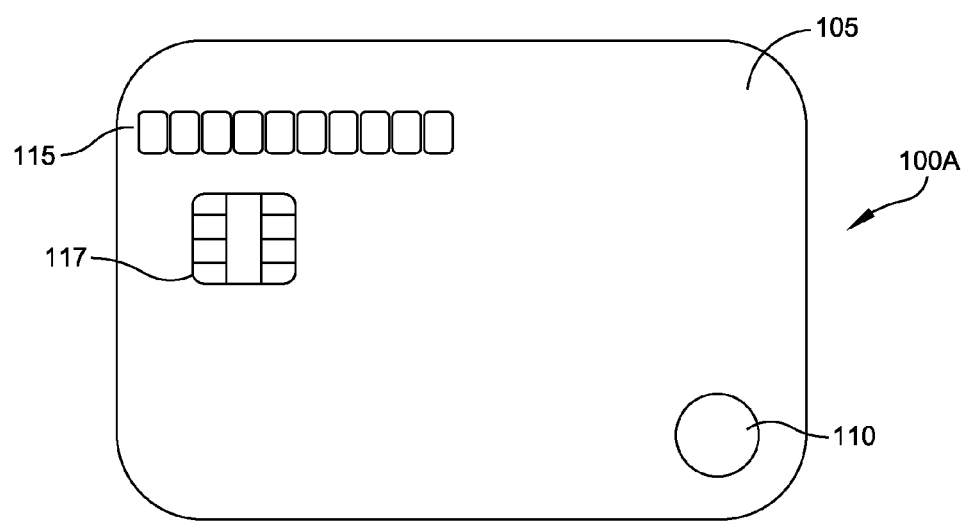
FIGS. 12A and 12B illustrate an embodiment of a transaction card that has a magnetic stripe for card-present transaction, a smart card interface for contactless smart card transactions and an OTP element as described herein for card-not-present transactions.
Figure 12B:
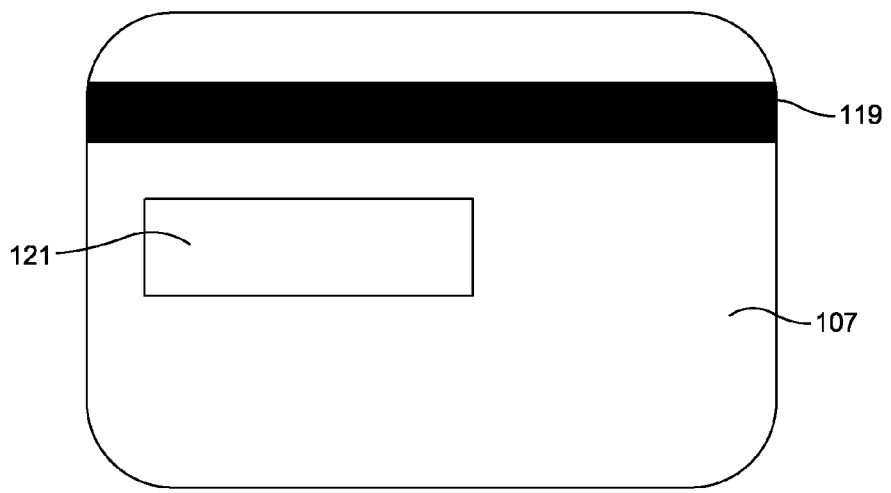

In embodiments, the OTP card can also be a credit card that has a magnetic stripe for card-present transaction and/or a smart card structure for contact or contactless transactions. This embodiment is shown in FIGS. 12A and 12B. The front surface 105 of transaction card 100A is shown in FIG. 12A, and the rear surface 107 is shown in FIG. 12B. The card 100A is identical to the card 100 except that it is configured as a credit (or debit) transaction card. The card 100A includes a standard magnetic stripe 119 and signature block 121 for use in card present transactions. The card 100A also includes a smart card interface 117 and embedded smart card processor for use in card present contactless card transactions. Moreover, the card includes OTP display 115 as described above for use in card-not-present transactions or debit transactions.

Figure 10A:
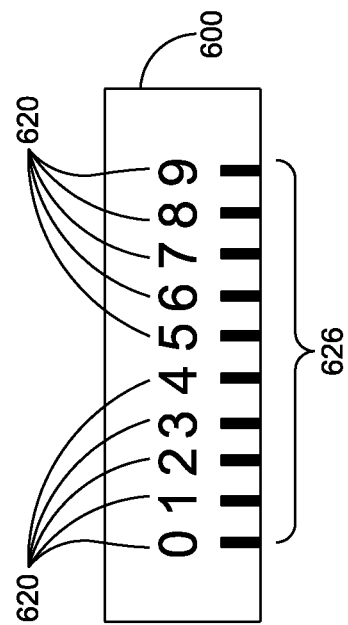
FIG. 10A illustrates a separately formed LCD or e-paper element display for connection to a PCB assembly to form an electronics inlay layer for an OTP card.
Figure 10:
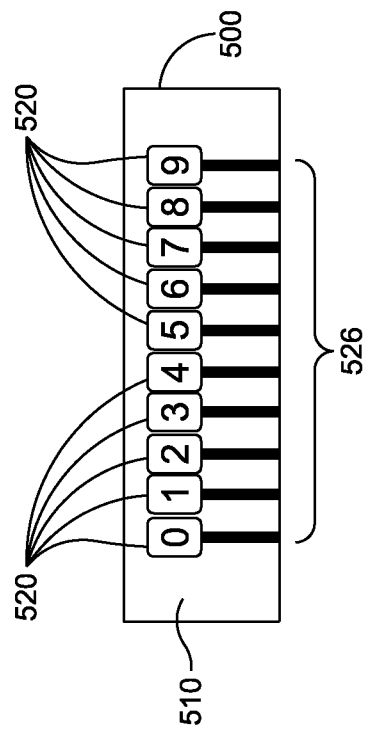
FIG. 10 illustrates a separately formed electrochromic element display for connection to a PCB assembly to form an electronics inlay layer for an OTP card.

FIGS. 10 and 10A show two alternatives to printing the electrochromic elements as described above on the PCB. Both figures illustrate symbol displays that are each manufactured as a distinct component that would then be attached to a suitable PCBa electronics inlay. FIG. 10 illustrates an electrochromic symbol display 500 that is formed generally in the manner described above. In the illustrated embodiment, the electrochromic elements 520 are printed on a PCB 510 and conductive paths 526 (e.g., copper lines) are formed on the PCB 510. These conductive paths 526 are located to align with similar traces on the main PCB containing the remainder of the components of the electronics inlay.

FIG. 10A illustrates that other technologies besides electrochromic elements can be used to create a symbol display. Two such technologies for producing this alternative display 600 include liquid crystal display (LCD) and electrophoretic displays, also known as E-Paper. Electrophoretic displays and imaging films to produce such displays are available from E Ink Corporation of Cambridge, Mass. and SiPix Imaging Inc. of Fremont, Calif. As with FIG. 10A, the display 600 includes conductive traces 626 for providing charge for selectively illuminating elements 620 and for aligning with conductive traces on the main PCB containing the remainder of the components of the electronics inlay. As with the electrochromic elements, the LCD and electrophoretic elements are formed as single segment constructions, meaning each digit is displayed by activating a single segment as opposed to more conventional designs where seven segments are provided per element and each digit is displayed by selectively providing power to the seven segments.

Figure 11:
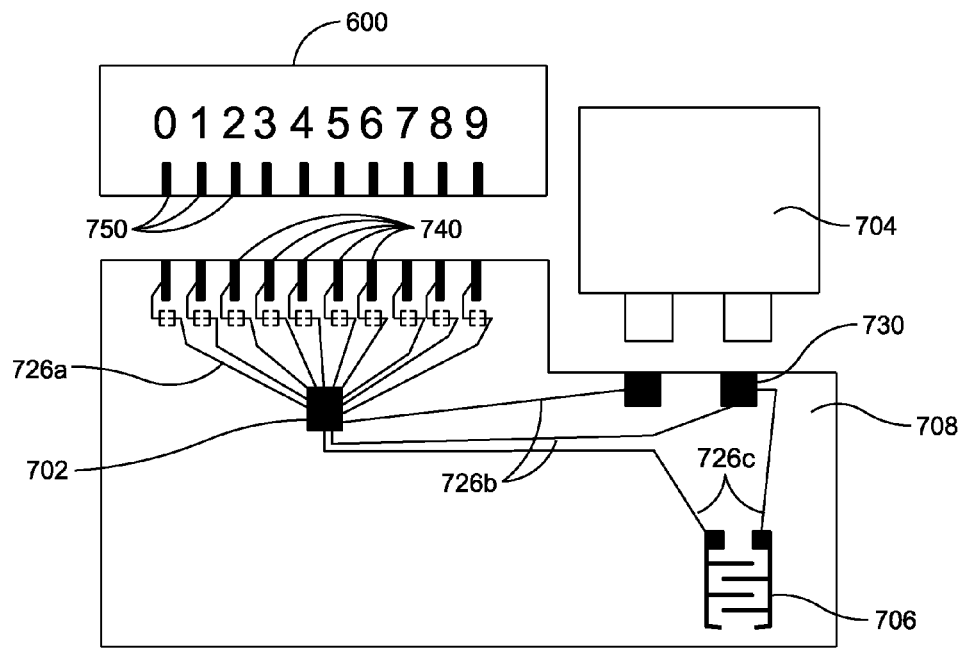
FIG. 11 illustrates the formation of an electronics inlay layer for an OTP card using the display of FIG. 10A.
Figure 11A:
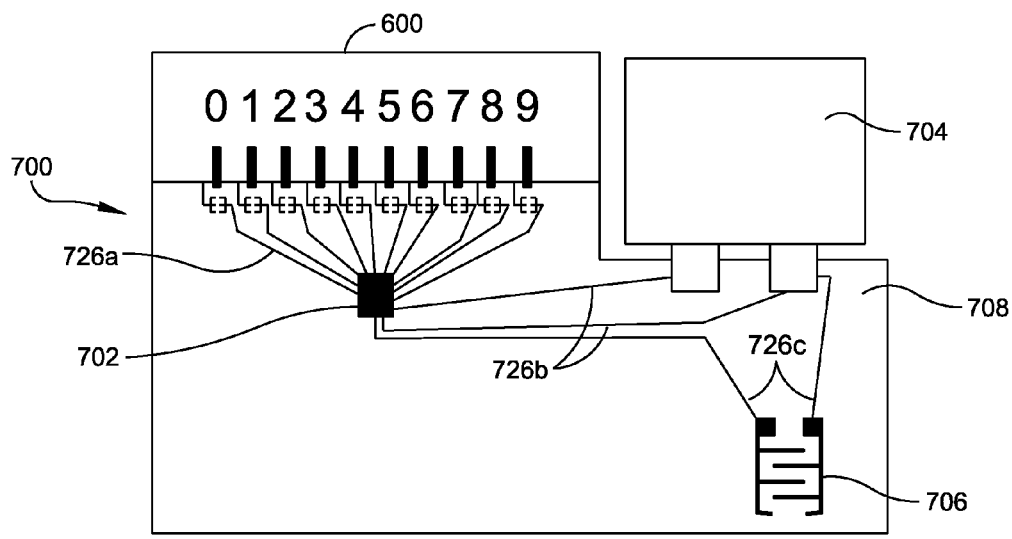

FIGS. 11 and 11A illustrate a method of forming an electronics inlay 700 using a separately formed display 600. The same technique would be used in connection with a separately formed electrochromic display 500. A shown in FIG. 11, a PCBa is provided comprising PCB substrate 708 having circuitry traces 726a, 726b and 726c and an activation switch 706. A secure microcontroller 702 is coupled to the wire traces 726. Thus far, the PCBa is very similar to the PCBa described above in connection with FIG. 5D. The PCBa also includes conductive connection regions, traces or pads 730, 740 disposed to align with and couple to conductors 750 of the display 600 and terminals of battery 704, respectively. As shown in FIGS. 11 and 11A, the battery 740 and symbol display 600 are properly aligned over the conductors 730, 740, respectively, and connected to the PCB substrate 708 via soldering, conductive adhesive, conductive tape or other means to form a completed electronics inlay 700 (FIG. 11A). The electronic can then be used in the manufacturing process illustrated in FIGS. 6-9 to form a completed OTP card 100.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A card for use in secure transactions, comprising:
a card body having a first major surface and a second major surface;
one or more groupings of a plurality of individual distinct symbols viewable from the first major surface, each individual distinct symbol comprising a single segment defining the individual distinct symbol that upon activation illuminates the respective individual distinct symbol; and
a controller coupled to the plurality of individual distinct symbols, the controller operable to produce a one-time password value and to selectively activate individual ones of individual distinct symbols to identify a sub-combination of the plurality of individual distinct symbols, thereby displaying an illuminated one-time password token for use in a secure transaction.

2. The card of claim 1, wherein each single segment defining a respective individual distinct symbol comprises a printed electrochromic ink element.

3. The card of claim 1, wherein each single segment defining a respective individual distinct symbol comprises a electrophoretic element.

4. The card of claim 1, wherein each single segment defining a respective individual distinct symbol comprises a liquid crystal display.

5. The card of claim 1, wherein the controller is programmed with an event based one-time password algorithm or a time based one-time password algorithm.

6. The card of claim 1, wherein the one or more groupings of the plurality of individual distinct symbols comprises a single grouping of numeric symbols consisting of the following set of symbols: 0, 1, 2, 3, 4, 5, 6, 7, 8, and 9.

7. The card of claim 6, wherein the controller is configured to sequentially activate individual ones of the individual distinct symbols to display the one-time password token.

8. The card of claim 1, wherein the controller is configured to sequentially activate individual ones of the individual distinct symbols to display the one-time password token.

9. The card of claim 1, wherein the groupings of individual distinct symbols are arranged in a grid having a plurality of rows of symbols, each row corresponding to a respective digit from a multi-digit one time password token, wherein the controller is configured to simultaneously activate individual ones of the individual distinct symbols to display the multi-digit one-time password token.

10. The card of claim 1, further comprising at least one activation button for manual activation of the card, in response to which the controller is operable to cause display of the one-time password token.

11. The card of claim 1, further comprising a thin film or printed battery power source.

12. The card of claim 1, wherein the card body comprises a laminate structure having an electronics inlay layer, the electronics inlay layer comprising: the one or more groupings of the plurality of individual distinct symbols; the controller; a battery power source; and electrical circuit connections between the controller and the one or more groupings of the plurality of individual distinct symbols.

13. The card of claim 12, wherein the laminate structure further comprises a printed overlay layer disposed over the electronics inlayer layer and having at least one window overlying the one or more groupings of the plurality of individual distinct symbols.

14. The card of claim 1, wherein the card body comprises a laminate structure having an electronics inlay layer, the electronics inlay layer comprising:
a first printed circuit board having the controller coupled thereto and electrical circuit connections for connecting the controller to the one or more groupings of the plurality of individual distinct symbols;
a display module comprising a second printed circuit board supporting the one or more groupings of the plurality of individual distinct symbols, the second printed circuit board being coupled to the first printed circuit board to connect the one or more groupings of the plurality of individual distinct symbols and the controller; and
a battery power source.

15. The card of claim 14, wherein the laminate structure further comprises a printed overlay layer disposed over the inlay layer and having at least one window overlying the one or more groupings of the plurality of individual distinct symbols.

16. The card of claim 1, wherein each individual distinct symbol is configured to switch between a visible state and an invisible state under control of the controller.

17. A card for use in secure transactions, comprising:
an electronics inlay layer comprising:
one or more substrates having formed or disposed thereon:
a grouping of spaced electrochromic elements each configured to illuminate, upon actuation thereof, a respective individual distinct symbol,
a controller, and
circuitry connecting the controller to the grouping of spaced electrochromic elements,
wherein the controller is programmed with an algorithm for producing a one-time password value and configured to selectively and sequentially activate individual ones of electrochromic elements to display for viewing a one-time password token for use in a secure transaction; and
a battery; and a top printed overlay layer disposed over the electronics inlay layer, wherein the one-time password token is viewable through the printed overlay layer.

18. The card of claim 17, further comprising a protective coating encapsulating the electronics inlay layer and a bottom printed overlay layer.

19. The card of claim 17, wherein each electrochromic element comprises a plurality of layers of ink.

20. The card of claim 17, wherein the substrate comprises a printed circuit board substrate and the circuitry comprises conductive traces formed thereon.

* * * * *